(12) United States Patent
Shimizu

(10) Patent No.: US 12,063,344 B2
(45) Date of Patent: Aug. 13, 2024

(54) REPRODUCTION DEVICE, REPRODUCTION METHOD, AND RECORDING MEDIUM

(71) Applicant: SONY GROUP CORPORATION, Tokyo (JP)

(72) Inventor: Takayoshi Shimizu, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 327 days.

(21) Appl. No.: 17/640,983

(22) PCT Filed: Aug. 31, 2020

(86) PCT No.: PCT/JP2020/032879
§ 371 (c)(1),
(2) Date: Mar. 7, 2022

(87) PCT Pub. No.: WO2021/049356
PCT Pub. Date: Mar. 18, 2021

(65) Prior Publication Data
US 2022/0337805 A1  Oct. 20, 2022

(30) Foreign Application Priority Data
Sep. 13, 2019 (JP) ................................. 2019-166893

(51) Int. Cl.
*H04N 13/373* (2018.01)
*G02B 27/01* (2006.01)
*H04N 13/376* (2018.01)

(52) U.S. Cl.
CPC ....... *H04N 13/373* (2018.05); *G02B 27/0101* (2013.01); *H04N 13/376* (2018.05); *G02B 2027/011* (2013.01)

(58) Field of Classification Search
CPC .............. H04N 13/373; H04N 13/376; G02B 27/0101; G02B 2027/011
See application file for complete search history.

(56) References Cited

U.S. PATENT DOCUMENTS 6,337,882 B1 * 1/2002 Boyer ............... H04N 21/4728
375/240.26
2002/0126914 A1 * 9/2002 Kotake ................ G06T 15/205
382/284

(Continued)

FOREIGN PATENT DOCUMENTS

CN   110637274 A    12/2019
EP    3633497 A1     4/2020

(Continued)

OTHER PUBLICATIONS

International Search Report and Written Opinion of PCT Application No. PCT/JP2020/032879, issued on Nov. 24, 2020, 08 pages of ISRWO.

*Primary Examiner* — Daniel T Tekle
(74) *Attorney, Agent, or Firm* — CHIP LAW GROUP

(57) ABSTRACT

The present technology relates to a reproduction device, a reproduction method, and a recording medium capable of suppressing influence of motion parallax and image distortion. There is provided a reproduction device including an image processing unit that performs processing including: projecting an image captured from a specific position in a real space on a projection surface arranged according to a reference position set in a virtual space; acquiring a head movement amount of a user viewing the projected image; changing, according to the head movement amount with respect to the reference position in a first direction that is at least one of a left-right direction or an up-down direction as viewed from the user, a first relative distance between the reference position and a user position in the first direction; changing, according to the head movement amount with respect to the reference position.

20 Claims, 16 Drawing Sheets

(56) References Cited

U.S. PATENT DOCUMENTS

| | | | |
|---|---|---|---|
| 2013/0141523 A1* | 6/2013 | Banta | H04N 21/4728 |
| | | | 348/36 |
| 2014/0270684 A1* | 9/2014 | Jayaram | H04N 5/0733 |
| | | | 386/224 |
| 2015/0205494 A1* | 7/2015 | Scott | G06F 3/04842 |
| | | | 345/158 |
| 2017/0295353 A1* | 10/2017 | Hwang | H04N 13/344 |
| 2017/0324945 A1* | 11/2017 | Cole | G11B 27/34 |
| 2019/0324529 A1* | 10/2019 | Stellmach | G06F 3/013 |
| 2020/0042169 A1* | 2/2020 | Croston | G06F 3/04845 |
| 2021/0183343 A1* | 6/2021 | Beith | G09G 5/38 |

FOREIGN PATENT DOCUMENTS

| | | |
|---|---|---|
| JP | 2018-163427 A | 10/2018 |
| WO | 2014/077046 A1 | 5/2014 |
| WO | 2018/216355 A1 | 11/2018 |
| WO | 2019/078033 A1 | 4/2019 |

\* cited by examiner

REPRODUCTION DEVICE, REPRODUCTION METHOD, AND RECORDING MEDIUM

CROSS REFERENCE TO RELATED APPLICATIONS

This application is a U.S. National Phase of International Patent Application No. PCT/JP2020/032879 filed on Aug. 31, 2020, which claims priority benefit of Japanese Patent Application No. JP 2019-166893 filed in the Japan Patent Office on Sep. 13, 2019. Each of the above-referenced applications is hereby incorporated herein by reference in its entirety.

TECHNICAL FIELD

The present technology relates to a reproduction device, a reproduction method, and a recording medium, and more particularly relates to a reproduction device, a reproduction method, and a recording medium capable of suppressing influence of motion parallax and image distortion.

BACKGROUND ART

In recent years, devices such as head mounted displays have been widely used as reproduction devices for viewing stereoscopic images.

In this type of reproduction device, a stereoscopic image is displayed on the basis of image information obtained by capturing an image of a subject with a plurality of cameras, and an image with a sense of immersion is provided to a user wearing the reproduction device on the head.

Furthermore, as a technique for viewing a stereoscopic image by the head mounted display, a technique disclosed in Patent Document 1 is known.

CITATION LIST

Patent Document

Patent Document 1: WO 2014/077046

SUMMARY OF THE INVENTION

Problems to be Solved by the Invention

Meanwhile, in a case where a user using a reproduction device is viewing a stereoscopic image, when the position of the head of the user moves, it is required to suppress influence of motion parallax and image distortion.

The present technology has been made in view of such a situation, and an object thereof is to enable suppression of influence of motion parallax and image distortion.

Solutions to Problems

A reproduction device according to one aspect of the present technology is a reproduction device an image processing unit that performs processing including: projecting an image captured from a specific position in a real space on a projection surface arranged according to a reference position set in a virtual space; acquiring a head movement amount of a user viewing the projected image; changing, according to the head movement amount with respect to the reference position in a first direction that is at least one of a left-right direction or an up-down direction as viewed from the user, a first relative distance between the reference position and a user position in the virtual space in the first direction; changing, according to the head movement amount with respect to the reference position in a second direction that is a front-back direction as viewed from the user, a second relative distance between the reference position and the user position in the second direction; and causing a change amount of the first relative distance with respect to the head movement amount in the first direction to be smaller than a change amount of the second relative distance with respect to the head movement amount in the second direction.

A reproduction method according to one aspect of the present technology is a reproduction method including, by a reproduction device: projecting an image captured from a specific position in a real space on a projection surface arranged according to a reference position set in a virtual space; acquiring a head movement amount of a user viewing the projected image; changing, according to the head movement amount with respect to the reference position in a first direction that is at least one of a left-right direction or an up-down direction as viewed from the user, a first relative distance between the reference position and a user position in the virtual space in the first direction; changing, according to the head movement amount with respect to the reference position in a second direction that is a front-back direction as viewed from the user, a second relative distance between the reference position and the user position in the second direction; and causing a change amount of the first relative distance with respect to the head movement amount in the first direction to be smaller than a change amount of the second relative distance with respect to the head movement amount in the second direction.

A recording medium according to one aspect of the present technology is a recording medium recording a program for causing a computer to function as an image processing unit that performs processing including: projecting an image captured from a specific position in a real space on a projection surface arranged according to a reference position set in a virtual space; acquiring a head movement amount of a user viewing the projected image; changing, according to the head movement amount with respect to the reference position in a first direction that is at least one of a left-right direction or an up-down direction as viewed from the user, a first relative distance between the reference position and a user position in the virtual space in the first direction; changing, according to the head movement amount with respect to the reference position in a second direction that is a front-back direction as viewed from the user, a second relative distance between the reference position and the user position in the second direction; and causing a change amount of the first relative distance with respect to the head movement amount in the first direction to be smaller than a change amount of the second relative distance with respect to the head movement amount in the second direction.

In the reproduction device, the reproduction method, and the recording medium according to one aspect of the present technology, an image captured from a specific position in a real space is projected on a projection surface arranged according to a reference position set in a virtual space, and a head movement amount of a user viewing the projected image is acquired. According to the head movement amount with respect to the reference position in a first direction that is at least one of a left-right direction or an up-down direction as viewed from the user, a first relative distance between the reference position and a user position in the virtual space in the first direction is changed, and according to the head movement amount with respect to the reference position in a second direction that is a front-back direction as viewed from the user, a second relative distance between the reference position and the user position in the second direction is changed, and a change amount of the first relative distance with respect to the head movement amount in the first direction is caused to be smaller than a change amount of the second relative distance with respect to the head movement amount in the second direction.

Note that the reproduction device of one aspect of the present technology may be an independent device or an internal block constituting one device.

MODE FOR CARRYING OUT THE INVENTION

Hereinafter, embodiments of the present technology will be described with reference to the drawings. Note that the description will be made in the following order.
1. Embodiments of present technology
2. Modification example
3. Configuration of computer 1. Embodiments of Present Technology When a user (experiencing person) wearing a head mounted display (HMD) experiences viewing of a three-dimensional virtual space by a full spherical image, it is necessary to fix a position of a virtual camera corresponding to a position of the head of a user U (hereinafter, referred to as a user position) in the virtual space to a position of a center Ct of a full spherical screen Sc in order to suppress image distortion (FIG. 1).

Figure 1:
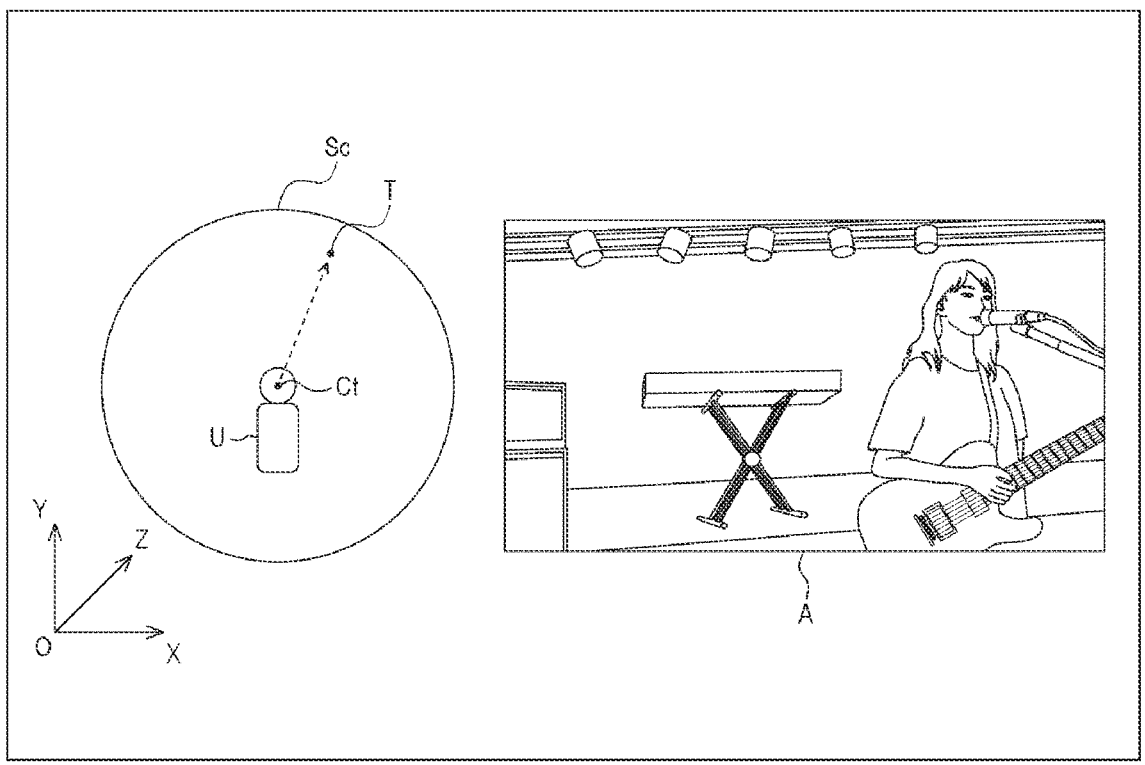
FIG. 1 is a diagram illustrating an example of a positional relationship and an image in a case where a user position coincides with a center position of a full spherical screen.

This makes it possible to prevent distortion of the image displayed on the display like an image in A of FIG. 1, but in a case where the user position approaches an imaged object (for example, a performer) or the like, a visual change does not occur with respect to a gravity change accompanying position movement of the head of the actual user (experiencing person), and thus a problem of VR sickness occurs due to influence of motion parallax.

Figure 2:
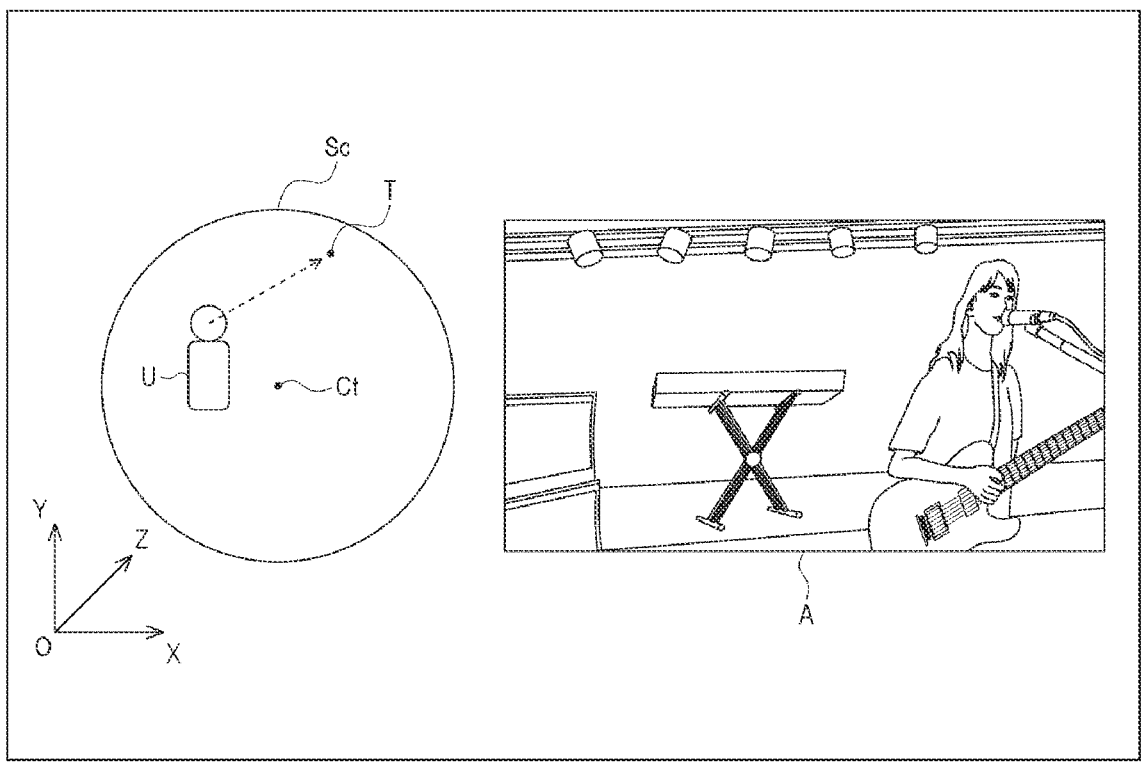
FIG. 2 is a diagram illustrating an example of a positional relationship and an image in a case where the user position is at a position other than the center position of the full spherical screen.

On the other hand, in order to suppress the occurrence of VR sickness, in a case where displacement movement of the user position is released in the virtual space surrounded by the full spherical image, it is assumed that the user position is at a position other than the position of the center Ct of the full spherical screen Sc (FIG. 2).

At this time, distortion in a vertical direction and a horizontal direction (vertical and horizontal directions) occurs significantly in the image displayed on the display like an image in A of FIG. 2. This occurs because a position of a camera that has performed image capturing in a real space corresponds to the position of the center Ct of the full spherical screen Sc, and there is no image capturing data when image capturing is performed from other angles.

As described above, in achieving the viewing experience of the three-dimensional virtual space by the full spherical image, there have been problems of VR sickness (influence of motion parallax) and image distortion. Therefore, the present technology proposes a method for simultaneously solving two problems of the VR sickness and the image distortion.

(Configuration of System)

Figure 3:
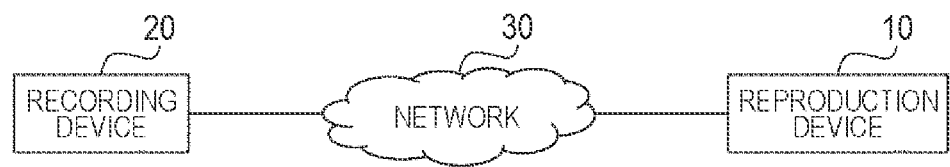
FIG. 3 is a diagram illustrating a configuration example of an image reproduction system to which the present technology is applied.
Figure 3:

FIG. 3 illustrates a configuration example of an image reproduction system 1 to which the present technology is applied.

The image reproduction system 1 includes a reproduction device 10 and a recording device 20. In the image reproduction system 1, the reproduction device 10 and the recording device 20 are connected to each other via a network 30. The network 30 includes a communication network such as the Internet, an intranet, and a mobile phone network.

The reproduction device 10 is an electronic device such as a head mounted display, a smartphone, a wearable device, or a game machine. In the following description, a head mounted display will be described as an example of the reproduction device 10.

The reproduction device 10 transmits a distribution request for image data to the recording device 20 via the network 30 according to an operation of the user, or the like. The reproduction device 10 receives the image data distributed from the recording device 20 via the network 30.

The reproduction device 10 performs image processing on the received image data, and displays (reproduces) a stereoscopic image (3D image) obtained as a result. For example, in the reproduction device 10, the stereoscopic image is displayed by arranging the full spherical screen Sc to which the full spherical image is projected in a three-dimensional virtual space on the basis of full spherical image data obtained by image capturing.

The recording device 20 includes a server that records image data for displaying a stereoscopic image (3D image), a workstation specialized in image processing, and the like. The recording device 20 is provided by a business operator or the like that provides a content service such as a stereoscopic image distribution service as a business.

The recording device 20 transmits (distributes) the image data via the network 30 as a response to the distribution request from the reproduction device 10.

(Example of Service)

Figure 4:
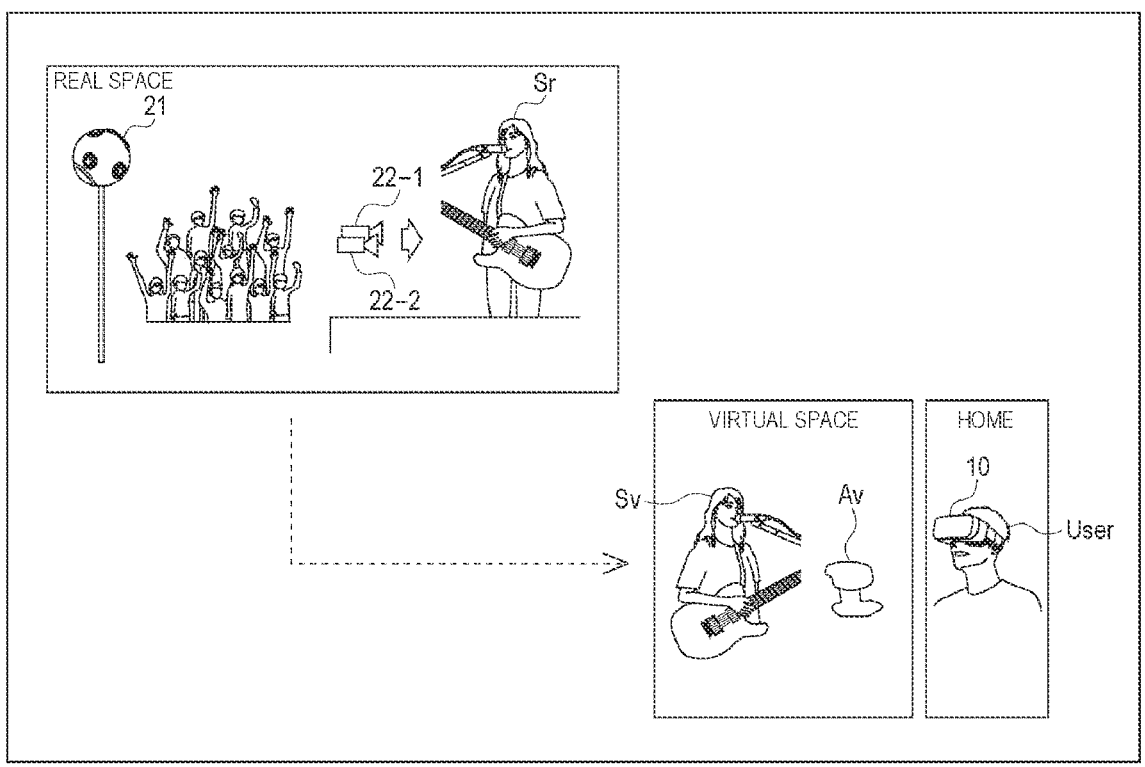
FIG. 4 is a diagram illustrating an example of a service provided by the image reproduction system in FIG. 3.

FIG. 4 illustrates an example of a video distribution service of a music live show as a service provided by the image reproduction system 1 of FIG. 3.

In this video distribution service of a music live show, image capturing data is obtained by image-capturing a subject Sr (for example, a performer) or the like with a camera such as a full spherical camera 21 or stereo imaging cameras 22-1 and 22-2 in a real space such as a live venue.

The image capturing data is transmitted to a recording device 20 installed in a studio or the like via a network, a recording medium, or the like. The recording device 20 includes a server, a workstation, and the like, performs image processing on the image capturing data, and records image data (for example, full spherical image data and the like) and sound data of the music live show obtained as a result.

The recording device 20 distributes data of the music live show via the network 30 in response to a distribution request from the reproduction device 10. Note that a dedicated distribution server may be provided in a data center or the like, and the distribution server may distribute the data of the music live show.

The reproduction device 10 receives the data of the music live show distributed from the recording device 20 via the network 30. The reproduction device 10 performs image processing on the image data of the music live show and displays a stereoscopic image of the music live show in a three-dimensional virtual space. Furthermore, the reproduction device 10 performs sound processing on the sound data of the music live show and outputs the sound of the music live show.

Thus, the user (experiencing person) wearing the reproduction device 10 such as a head mounted display on the head in the real space in a home or the like can feel as if he or she is at the music live show by viewing an imaged object Sv (for example, a performer) in the virtual space at a desired angle and size and listening to the performance. Note that an avatar Av of the user may be arranged in the virtual space.

(Configuration of Reproduction Device)

Figure 5:
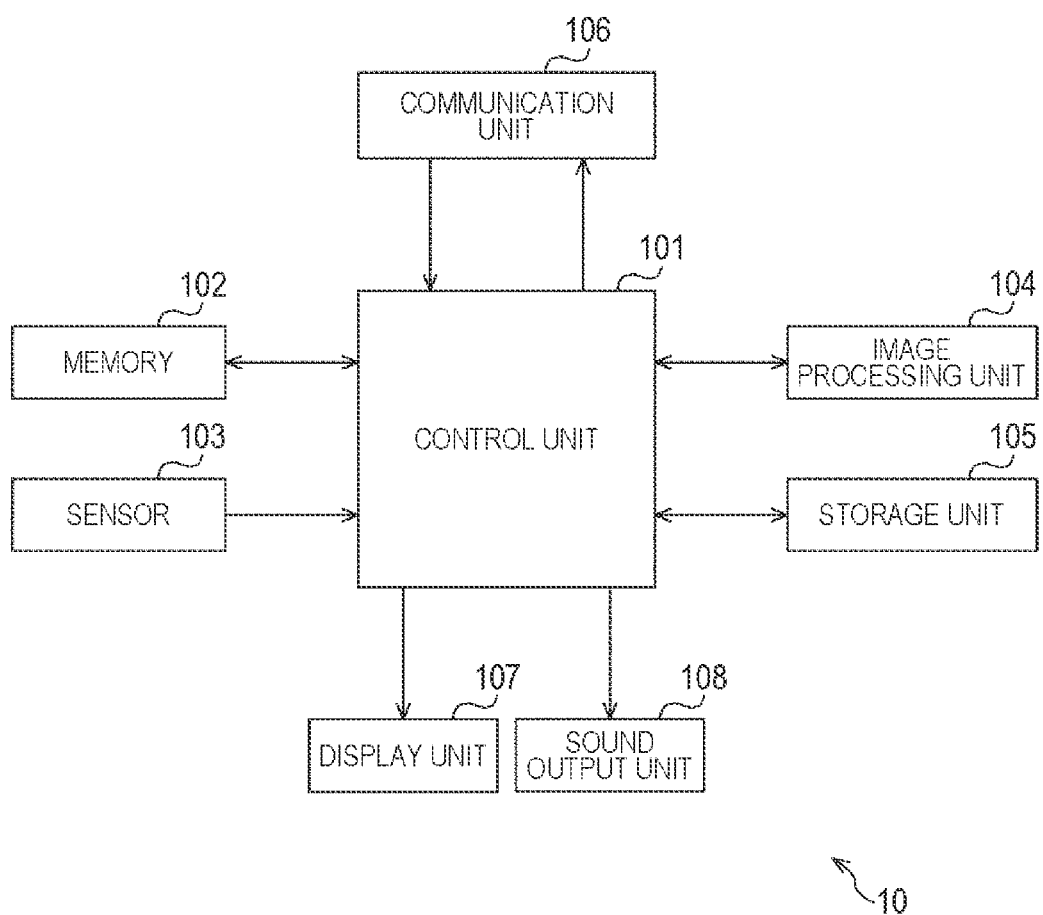
FIG. 5 is a diagram illustrating a configuration example of a reproduction device in FIG. 3.

FIG. 5 illustrates a configuration example of the reproduction device 10 of FIG. 3.

In FIG. 5, the reproduction device 10 includes a control unit 101, a memory 102, a sensor 103, an image processing unit 104, a storage unit 105, a communication unit 106, a display unit 107, a sound output unit 108, and the like.

The control unit 101 includes a processor such as a central processing unit (CPU). The control unit 101 is a central control device (processing device) that controls operation of each unit and performs various types of arithmetic processing, and controls operation of each unit of the reproduction device 10.

The memory 102 includes a semiconductor memory such as a random access memory (RAM). The memory 102 temporarily stores various data processed by the control unit 101.

The sensor 103 includes various sensor devices. The sensor 103 performs sensing of the user, surroundings thereof, and the like, and supplies sensor data obtained as a result of the sensing to the control unit 101. The control unit 101 performs various types of processing on the basis of the sensor data supplied from the sensor 103.

As the sensor 103, an inertial measurement unit (IMU) that measures three-dimensional angular velocity and acceleration, or the like is included. The inertial measurement unit (IMU) can obtain a three-dimensional angular velocity and acceleration by a three-axis gyroscope and a three-direction accelerometer.

Note that the sensor 103 may include a proximity sensor that measures a close object, a biological sensor that measures information such as a heart rate, a body temperature, or a posture of a living thing, a magnetic sensor that measures a magnitude or a direction of a magnetic field, and the like.

The image processing unit 104 includes a processor such as a graphics processing unit (GPU). The image processing unit 104 performs predetermined image processing on image data or the like under control of the control unit 101. Display data obtained by the image processing is supplied to the display unit 107.

The storage unit 105 is an auxiliary storage device including a semiconductor memory such as a nonvolatile memory. The storage unit 105 may be configured as an internal storage or may be an external storage such as a memory card.

The storage unit 105 records various data such as image data and sound data under control of the control unit 101. The control unit 101 can read and process various data recorded in the storage unit 105.

The communication unit 106 is configured as a communication device (communication module) compatible with wireless communication such as wireless local area network (LAN) or cellular communication (for example, LTE-Advanced, 5G, or the like), or wired communication. The communication unit 106 communicates with other devices via the network 30 under control of the control unit 101.

The communication unit 106 transmits a distribution request for image data to the recording device 20 via the network 30. The communication unit 106 receives image data and sound data distributed from the recording device 20 via the network 30. The image data is supplied to the image processing unit 104 via the control unit 101 and processed, or supplied to the storage unit 105 and recorded.

The display unit 107 is a display device such as a liquid crystal panel or an organic light emitting diode (OLED) panel. The display unit 107 displays (draws) a stereoscopic image and various types of information according to display data from the image processing unit 104 under control of the control unit 101.

The sound output unit 108 is a sound output device such as a speaker, or an earphone, a headphone, or the like connected via a connector, or the like. The sound output unit 108 outputs a sound corresponding to the sound data distributed together with the image data under control of the control unit 101.

(Details of Image Processing Unit)

Figure 6:
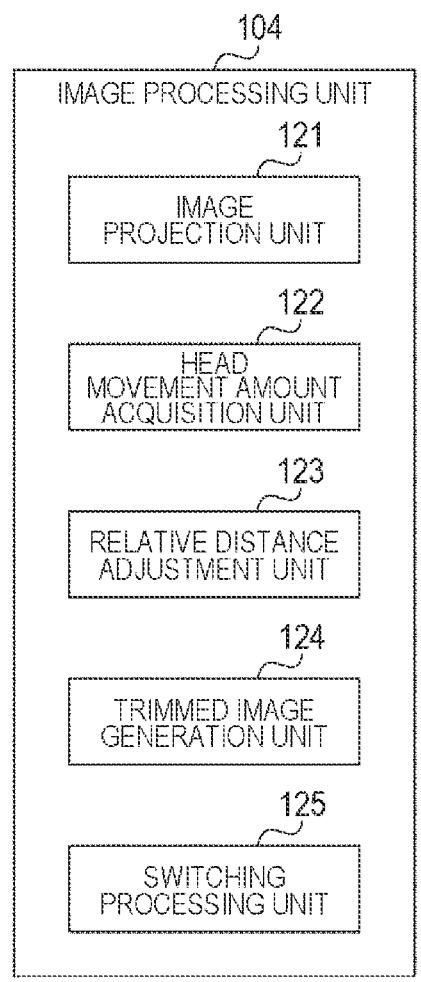
FIG. 6 is a diagram illustrating a detailed configuration of an image processing unit in FIG. 5.

FIG. 6 illustrates a detailed configuration of the image processing unit 104 in FIG. 5.

In FIG. 6, the image processing unit 104 includes an image projection unit 121, a head movement amount acquisition unit 122, a relative distance adjustment unit 123, a trimmed image generation unit 124, a switching processing unit 125, and the like.

The image projection unit 121 performs processing of projecting a captured image obtained from image data on (the projection surface of) the full spherical screen Sc in a three-dimensional virtual space.

The head movement amount acquisition unit 122 performs processing of acquiring a head movement amount of the user wearing the reproduction device 10 such as the head mounted display on the basis of the sensor data or the like from the sensor 103.

The relative distance adjustment unit 123 performs processing of adjusting a relative distance between a reference position (position corresponding to the center Ct of the full spherical screen Sc) set in the virtual space and the user position (position of the head of the user U in the virtual space) on the basis of information such as the head movement amount acquired by the head movement amount acquisition unit 122.

The trimmed image generation unit 124 performs processing of generating a trimmed image cut out from the captured image projected on the full spherical screen Sc.

The switching processing unit 125 performs processing of switching between an image corresponding to the virtual camera arranged corresponding to the user position and an image corresponding to the virtual sub-camera arranged on a straight line connecting the viewpoint of the user and the reference position in the virtual space.

(Suppression of VR Sickness and Image Distortion)

Figure 7:
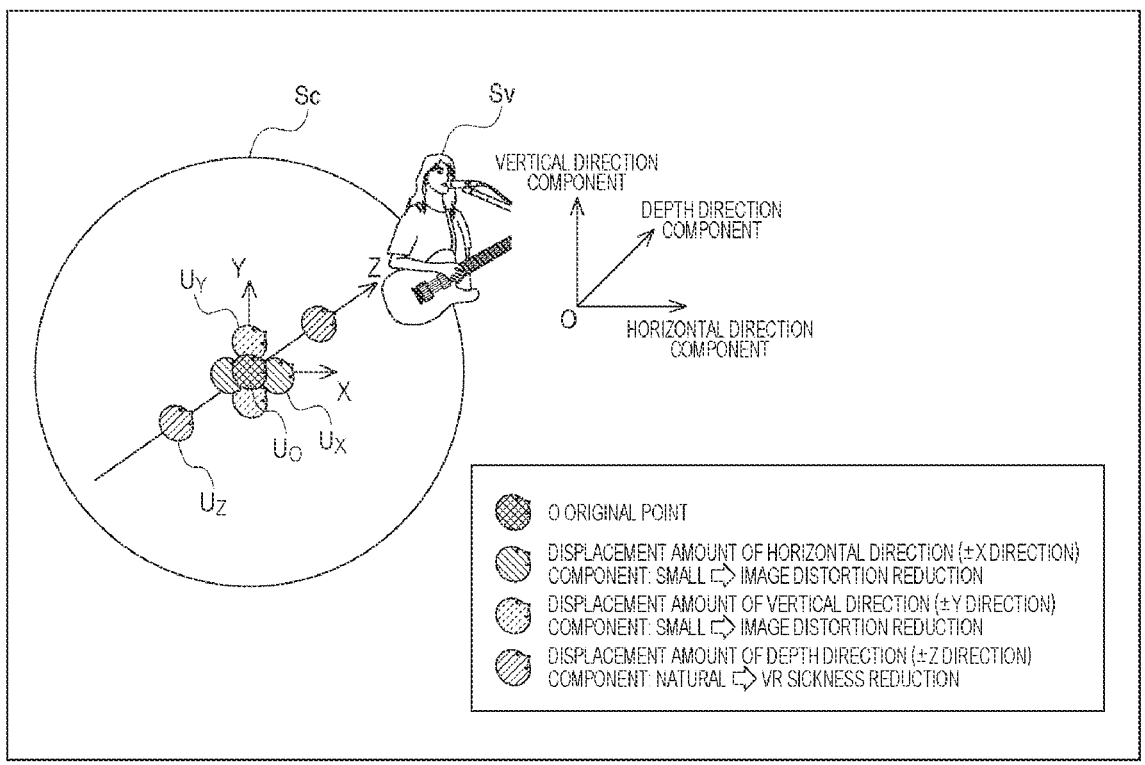
FIG. 7 is a diagram describing a method of suppressing VR sickness and image distortion to which the present technology is applied.

FIG. 7 illustrates a method of suppressing the VR sickness and the image distortion to which the present technology is applied. Note that in FIG. 7, the virtual space in which the full spherical screen Sc on which the captured image is projected is arranged is represented by a world coordinate system with XYZ axes.

In FIG. 7, the size of the diameter of the full spherical screen Sc is converted to a size larger than the actual size so that a displacement amount of each component of the XYZ axes of the reproduction device 10 such as the head mounted display worn by the user can be ignored (canceled) when the captured image is projected on the full spherical screen Sc.

In the reproduction device 10, an inverse vector of a movement vector of the head of the user is given to the full spherical screen Sc in conjunction with movement of the head of the user, so that the image is substantially enlarged (plus) or reduced (minus). Thus, a magnification ratio of the captured image projected on the full spherical screen Sc is changed, and a zoom function of the image is achieved.

At this time, the image distortion is reduced by multiplying a horizontal direction component and a vertical direction component that affect the image distortion by an attenuation coefficient that reduces the displacement amount of the inverse vector ($U_X$ and $U_Y$ in the diagram).

That is, when the head of the user moves in the horizontal direction or the vertical direction, the displacement amount in the horizontal direction or the vertical direction can be reduced by multiplying an inverse vector (the horizontal direction component or the vertical direction component of) corresponding to the movement by the attenuation coefficient for reducing the displacement amount. Therefore, the image distortion can be reduced.

On the other hand, by multiplying a depth direction component in which the image distortion is inconspicuous by an appropriate coefficient in consideration of the scale of the full spherical screen Sc, the VR sickness is reduced ($U_Z$ in the diagram). Here, the appropriate coefficient can be a value that generates natural motion parallax in the depth direction suitable for the sense of movement of the head of the user.

That is, when the head of the user moves in the depth direction, it is possible to generate natural motion parallax in the depth direction suitable for the sense of movement of the head of the user by multiplying (the depth direction component of) the inverse vector corresponding to the movement by a coefficient corresponding to the scale of the full spherical screen Sc. Therefore, it is possible to reduce the VR sickness caused by influence of motion parallax.

Thus, in the reproduction device 10, two problems of the VR sickness and the image distortion at a time of viewing the full spherical image are solved, and the VR sickness and the image distortion can be simultaneously suppressed.

Note that in a case where the image distortion is conspicuous in a region deviated from the center Ct of the full spherical screen Sc, this region corresponding to the background and deviated from the center Ct may be cut, and a background image in which objects such as computer graphics (CG) or particles are arranged in a predetermined pattern on the basis of a plain background in black or the like may be used. Alternatively, the imaged object (for example, the performer) may be subjected to green back capturing, and distortion components of the image may be removed using chroma key composition with a 3D CG background.

Furthermore, the displacement amount of the component in the horizontal direction or the vertical direction may be limited by detecting the start position of image distortion and installing a boundary fence region that limits the displacement amount of each component of the XYZ axes with the detection position being a boundary, and the like. Thus, the displacement amount of the component in the horizontal direction or the vertical direction is limited, and the image distortion can be suppressed.

(Flow of Image Processing)

Next, a flow of image processing corresponding to suppression of the VR sickness and the image distortion will be described with reference to a flowchart of FIG. 8.

In step S11, the image projection unit 121 converts the full spherical screen Sc into a sufficient diameter size in which the displacement amount of each component of the XYZ axes of the reproduction device 10 can be ignored.

In step S12, the image projection unit 121 projects the captured image on (the projection surface of) the full spherical screen Sc.

In step S13, the head movement amount acquisition unit 122 acquires the head movement amount of the user viewing the projected captured image.

In step S14, the relative distance adjustment unit 123 determines whether the user position has moved from the position of the center Ct of the full spherical screen Sc on the basis of the acquired information such as the head movement amount.

In a case where it is determined in the determination processing of step S14 that the user position has moved from the position of the center Ct, the processing proceeds to step S15.

In step S15, the relative distance adjustment unit 123 changes the relative distance between the reference position and the user position in the horizontal direction and the vertical direction by multiplying the inverse vector of the movement vector of the user by the attenuation coefficient for reducing the displacement amount thereof as the horizontal direction component and the vertical direction component of the full spherical screen Sc.

In step S16, the relative distance adjustment unit 123 changes the relative distance between the reference position and the user position in the depth direction by multiplying the inverse vector of the movement vector of the user by an appropriate coefficient in consideration of the scale of the full spherical screen Sc as a depth component of the full spherical screen Sc.

Here, when the inverse vector of the movement vector of the user is given to the full spherical screen Sc in conjunction with the movement of the head of the user wearing the reproduction device 10, the horizontal direction component and the vertical direction component that affect the image distortion are multiplied (S15) by the attenuation coefficient for reducing the displacement amount of the inverse vector, and the depth direction component in which the image distortion is inconspicuous is multiplied (S16) by the appropriate coefficient in consideration of the scale of the full spherical screen Sc.

In a case where the processing of step S16 ends or it is determined as negative in the determination processing of step S14 ("No" in S14), the processing returns to the processing of step S13, the processing of steps S13 to S16 is repeated, and in conjunction with the movement of the head of the user wearing the reproduction device 10, in the reproduction device 10, for example, an image in which the visible range of the imaged object Sv (for example, the performer) in the virtual space changes or the size changes is drawn.

Note that in the processing of steps S15 and S16 described above, although the case where the head of the user moves in three directions of the XYZ axes has been described, in a case where the head of the user moves in at least one direction (one direction, two directions, or three directions) of the ±X direction, the ±Y direction, or the ±Z direction, the processing of steps S15 and S16 may be performed according to the moving direction.

The flow of the image processing has been described above.

That is, in this image processing, the image processing unit 104 of the reproduction device 10 performs processing of projecting (S12) an image (captured image) captured from a specific position (positions of cameras such as the full spherical camera 21 and the stereo imaging cameras 22-1 and 22-2) in a real space on a projection surface (full spherical screen Sc) arranged according to a reference position (position corresponding to the center Ct of the full spherical screen Sc) set in a virtual space, acquiring (S13) a head movement amount of a user (experiencing person) viewing the projected image, changing (S15), according to the head movement amount with respect to the reference position in a first direction that is at least one of a left-right direction or an up-down direction (horizontal direction and vertical direction) as viewed from the user, a first relative distance between the reference position and a user position (position of the head of the user U) in the virtual space in the first direction, and changing (S16), according to the head movement amount with respect to the reference position in a second direction that is a front-back direction (depth direction) as viewed from the user, a second relative distance between the reference position and the user position in the second direction.

At this time, a change amount (displacement amount) of the first relative distance with respect to the head movement amount in the first direction (at least one of the horizontal direction or the vertical direction) is smaller than a change amount (displacement amount) of the second relative distance with respect to the head movement amount in the second direction (depth direction) (S15 and S16).

Specifically, the image processing unit 104 can multiply by a first coefficient (attenuation coefficient) that reduces a change amount of the first relative distance with respect to the head movement amount as a component in the first direction. That is, the image processing unit 104 changes the first relative distance by multiplying an inverse vector of a movement vector corresponding to the head movement amount by the first coefficient (attenuation coefficient) that reduces a change amount thereof as a component in the first direction on the projection surface (full spherical screen Sc).

Furthermore, the image processing unit 104 can multiply by a second coefficient corresponding to a size of the projection surface (an appropriate coefficient in consideration of the scale of the full spherical screen Sc) as a component in the second direction. This second coefficient is a value that generates natural motion parallax in the second direction according to the movement of the head of the user. For example, the first coefficient and the second coefficient have a relationship of second coefficient>first coefficient>0.

As described above, the VR sickness is reduced by giving an appropriate coefficient to the depth direction component, and the image distortion is reduced by giving the attenuation coefficient in which the displacement amount of the inverse vector is reduced to the horizontal direction component and the vertical direction component. Therefore, it is possible to simultaneously suppress the VR sickness and the image distortion.

For example, in a case where the user (experiencing person) wearing the head mounted display or the like on his or her head experiences viewing of a live action of the full spherical screen, there is a tendency that a request for getting closer to the imaged object (for example, the performer) in the virtual space increases.

On the other hand, in the present technology, by applying the above-described image processing, it is possible to perform processing of drawing an image by zooming the image naturally and correctly in conjunction with the movement of the user approaching (the image of) the live-action projected on the full spherical screen, and thus it is possible to reproduce the motion parallax experience equivalent to the real experience. Consequently, it is possible to suppress (reduce) the VR sickness.

At that time, for example, by reducing or canceling a horizontal direction component (generated when walking) and a vertical direction component (generated when crouching) of the movement vector of the position of the user's head, which are generated when the user walks or crouches, it is possible to suppress (reduce) the distortion of (an image of) the live action in the vertical direction and the horizontal direction (vertical and horizontal directions). Consequently, the reality and quality of (an image of) the live action are secured, and the value of the viewing experience of the live action can be improved.

(Arrangement of Complementary Camera)

Incidentally, in a case where it is assumed that the center position of a rectangle of the trimmed image cut out from the projected captured image overlaps with the position of the center Ct of the full spherical screen Sc as a condition for not generating the image distortion, when this condition is satisfied, it is possible to achieve a zoom function in the depth direction (±Z direction) without generating the image distortion.

Figure 9:
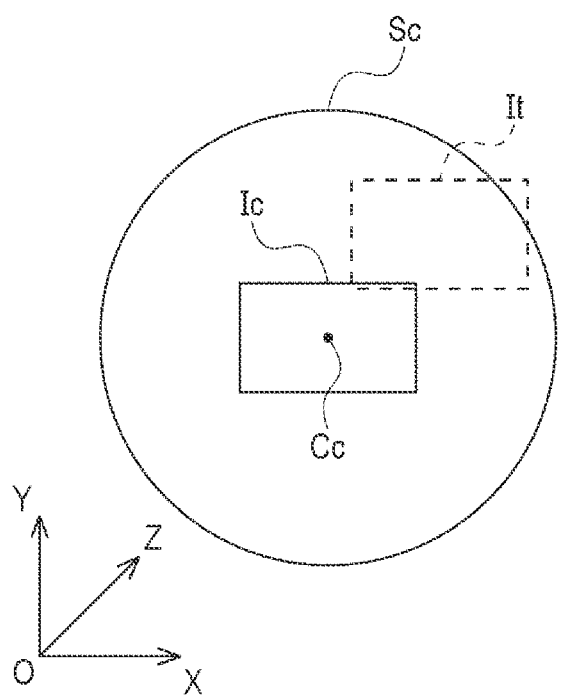
FIG. 9 is a diagram describing an example of distortion of a trimmed image.

FIG. 9 illustrates an example of distortion of the trimmed image. Note that, in FIG. 9, the virtual space in which the full spherical screen Sc on which the captured image is projected is arranged is represented by the world coordinate system with XYZ axes.

In FIG. 9, in a trimmed image It cut out in a case where the user position, that is, the position of the virtual camera deviates from the position of the center Ct of the full spherical screen Sc, distortion generated in the vertical direction and the horizontal direction (vertical and horizontal directions) becomes large (a dashed-line rectangle in the diagram).

On the other hand, in FIG. 9, in a trimmed image Ic obtained in a case where the user position (the position of the virtual camera) coincides with the position of the center Ct of the full spherical screen Sc, the distortion generated in the vertical direction and the horizontal direction (vertical and horizontal directions) becomes small (a solid-line rectangle in the diagram).

That is, in a case where the user position deviates from the position of the center Ct, in order to obtain a trimmed image with smaller distortion, it is only required to use an image obtained from a virtual camera installed at a predetermined position corresponding to the center Ct of the full spherical screen Sc.

Here, in addition to a virtual camera Cm corresponding to the user position, a virtual sub-camera Cs for complementing the virtual camera Cm is arranged at the predetermined position corresponding to the center Ct of the full spherical screen Sc, and when the trimmed image is cut out, the virtual camera Cm is switched to the virtual sub-camera Cs. Then, a trimmed image corresponding to the position (hereinafter, referred to as a complementary camera position) of the complementary virtual sub-camera Cs is generated.

Here, an example of a method of arranging the complementary virtual sub-camera Cs to which the present technology is applied will be described with reference to FIG. 10. Note that also in FIG. 10, the virtual space is represented in the world coordinate system with XYZ axes.

Figure 10:
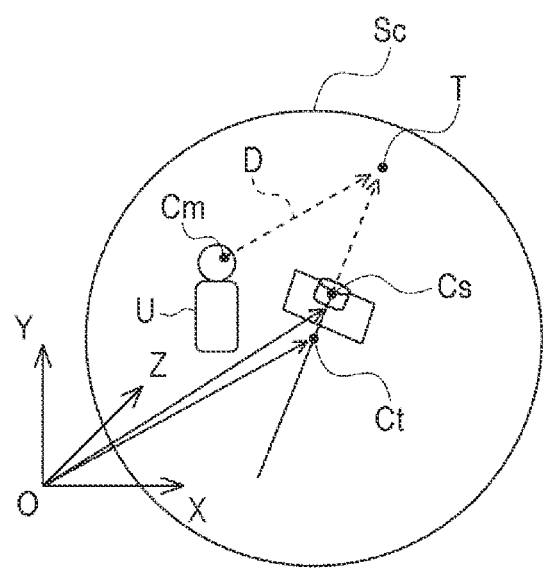
FIG. 10 is a diagram describing an example of a method of arranging complementary virtual sub-cameras.

In FIG. 10, the virtual sub-camera Cs is arranged at a position that is on a straight line passing through the position of a viewpoint T of the user on the full spherical screen Sc and the position of the center Ct of the full spherical screen Sc and is separated by the same distance as a distance D. Note that the distance D represents the distance between the position of the viewpoint T on the full spherical screen Sc and the user position (the position of the virtual camera Cm).

A vector arithmetic expression for specifying an arrangement position and posture of the virtual sub-camera Cs can be expressed as follows, for example.

That is, in the world coordinate system, the position vector of the virtual sub-camera Cs is expressed by the following Equation (1).

[Equation 1]

$$\vec{OCs} = \vec{OCt} + \vec{CtCs} \quad (1)$$

Furthermore, a vector from the position of the center Ct of the full spherical screen Sc toward the position of the virtual sub-camera Cs is expressed by the following Equation (2) using a vector from the position of the center Ct toward the position of the viewpoint T and the distance D.

[Equation 2]

$$\vec{CtCs} = \vec{CtT} \cdot \text{norm} \times D \quad (2)$$

Note that in Equation (2), "·norm" represents normalization.

At this time, the distance D is expressed by a relationship of the following Equation (3).

[Equation 3]

$$D|\vec{CmT}| = |\vec{CsT}| \quad (3)$$

(Flow of Trimmed Image Generation Processing)

Figure 11:
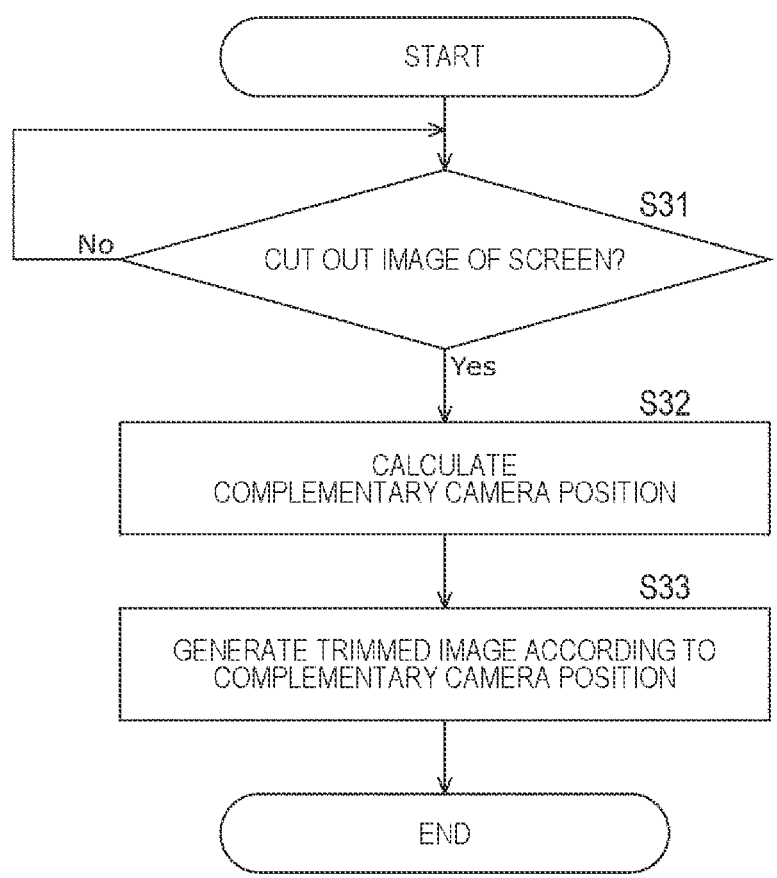
FIG. 11 is a flowchart describing a flow of trimmed image generation processing.

Next, a flow of trimmed image generation processing will be described with reference to a flowchart of FIG. 11.

In step S31, the control unit 101 determines whether to cut out an image on the screen according to the operation of the user.

This operation includes an operation for performing a screenshot function, or the like. Note that an image cutting out function may be implemented not only on the basis of the operation of the user but also on the basis of a predetermined event, trigger, or the like.

In a case where it is determined in the determination processing of step S31 to cut out the image, the processing proceeds to step S32. In step S32, the trimmed image generation unit 124 calculates a complementary camera position as the position of the virtual sub-camera Cs using the above-described vector arithmetic expression.

In step S33, the trimmed image generation unit 124 generates the trimmed image according to the position and posture of the virtual sub-camera Cs installed at the calculated complementary camera position.

The trimmed image is recorded in the storage unit 105 or displayed on the display unit 107. Note that when the processing of step S33 ends, the processing ends.

The flow of the trimmed image generation processing has been described above.

In this trimmed image generation processing, when the user performs the screenshot function or the like in the virtual space in which the full spherical screen Sc on which the captured image is projected is arranged, the trimmed image corresponding to the position and posture of the virtual sub-camera Cs installed at the predetermined position corresponding to the center Ct of the full spherical screen Sc is generated. Therefore, a trimmed image in which distortion is suppressed can be obtained.

(Method of Switching User Position)

Next, a method of seamlessly switching the user position with respect to the viewpoint T on the full spherical screen Sc in the virtual space will be described.

Figure 12:
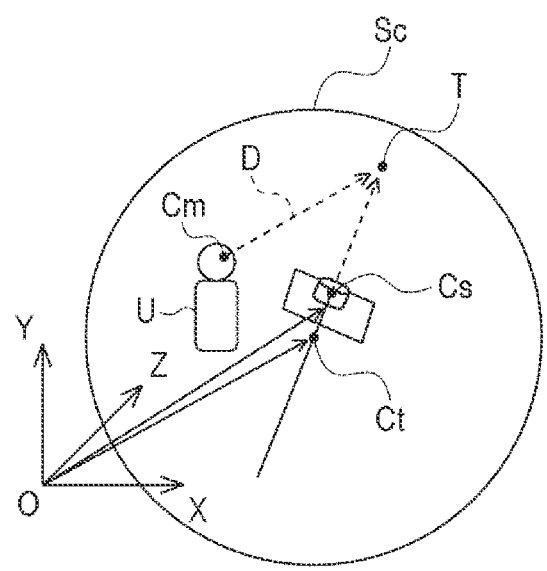
FIG. 12 is a diagram illustrating a relationship between a virtual camera and a virtual sub-camera with respect to a position of a viewpoint.

FIG. 12 illustrates a relationship between the positions of the virtual camera Cm and the virtual sub-camera Cs with respect to the position of the viewpoint T on the full spherical screen Sc. Note that in FIG. 12, the virtual space in which the full spherical screen Sc on which the captured image is projected is arranged is represented by the world coordinate system with XYZ axes.

As illustrated in FIG. 12, the virtual sub-camera Cs can be arranged on a straight line passing through the position of the viewpoint T on the full spherical screen Sc and the position of the center Ct of the full spherical screen Sc. Furthermore, the position of the virtual camera Cm corresponds to the user position.

Here, the virtual camera Cm and the virtual sub-camera Cs are used to seamlessly switch the user position.

Figure 13:
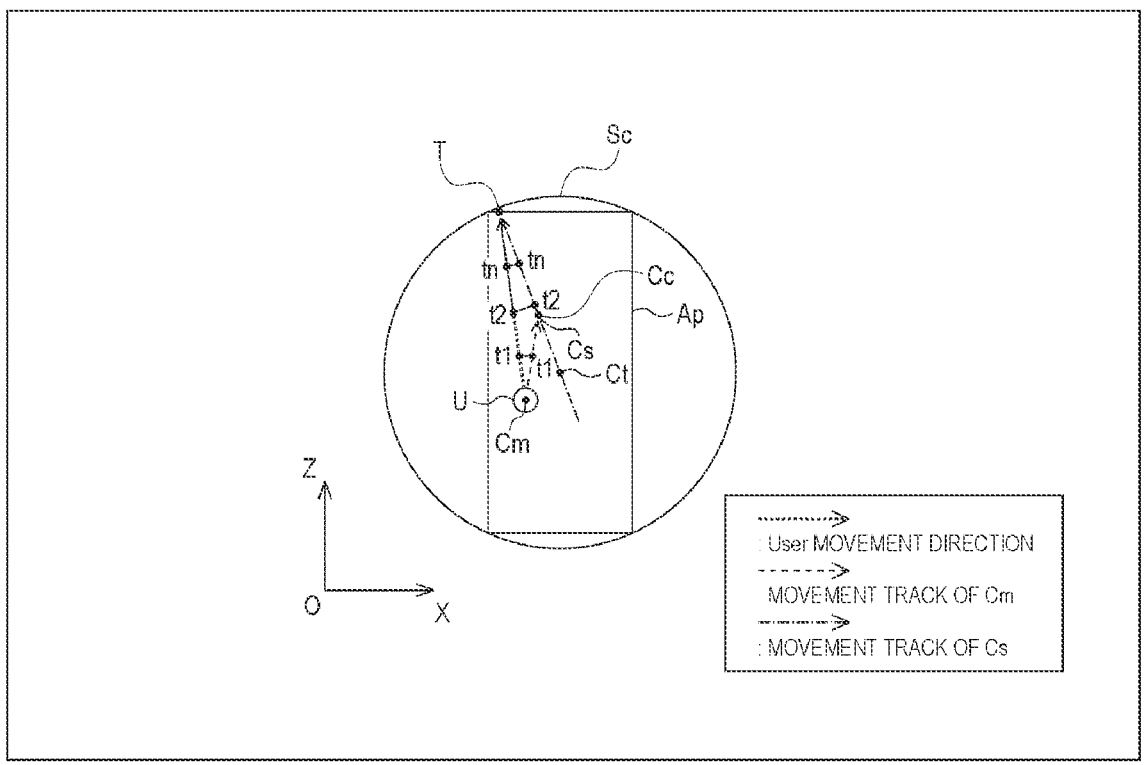
FIG. 13 is a diagram describing an example of a method of switching a user position.

FIG. 13 illustrates an example of a method of switching a user position to which the present technology is applied. Note that FIG. 13 illustrates a case where the full spherical screen Sc arranged in the virtual space represented by the world coordinate system with XYZ axes is viewed from a ZX plane.

In FIG. 13, the position of the virtual camera Cm is gradually brought closer to a straight line of a movement track of the virtual sub-camera Cs so that image distortion viewed by the user does not occur. That is, by causing the position of the virtual camera Cm to gradually approach the straight line of the movement track of the virtual sub-camera Cs at predetermined time intervals along the movement track, the distance D from the user position to the position of the viewpoint T is not affected.

Then, at the camera switching point Cc at the time when the position of the virtual camera Cm intersects the straight line of the movement track of the virtual sub-camera Cs, the virtual camera Cm is switched to the virtual sub-camera Cs, and the user position is seamlessly switched from the movement track of the virtual camera Cm to the movement track of the virtual sub-camera Cs. Thereafter, the position of the virtual sub-camera Cs according to the user position is moved on the movement track at predetermined time intervals so as to approach the position of the viewpoint T.

In FIG. 13, a black circle on a straight line indicated by times t1, t2, ... tn (n: integer of 1 or more) indicates that the distance D from the position of the viewpoint T is the same between a moving direction (dotted line in the drawing) according to the user's movement intention toward the viewpoint T and the actual movement tracks of the virtual cameras (Cm and Cs) (dashed line and dashed-dotted line in the drawing).

Thus, the movement tracks of the virtual cameras (Cm and Cs) can be set to movement tracks that provide natural motion parallax in the depth direction (±Z direction), and consequently, the VR sickness can be suppressed.

Note that FIG. 13 illustrates a case where the virtual camera Cm is switched to the virtual sub-camera Cs when the position of the virtual camera Cm is brought closer to the position of the viewpoint T, but conversely, in a case where the position of the virtual sub-camera Cs is moved away from the position of the viewpoint T, it is only required to perform as follows.

That is, when the position of the virtual sub-camera Cs is moved away from the position of the viewpoint T on the straight line of the movement track of the virtual sub-camera Cs and reaches the camera switching point Cc, it is only required to seamlessly switch from the movement track of the virtual sub-camera Cs to the movement track of the virtual camera Cm to return to the movement track of the virtual camera Cm.

Furthermore, in FIG. 13, a rectangular boundary fence region Ap inscribed in the circular full spherical screen Sc represents a region where the user U (virtual camera Cm and virtual sub-camera Cs) is allowed to move in the virtual space. Since the movement of the user position is restricted by setting this boundary fence region Ap, for example, the movement in the horizontal direction (±X direction) is restricted, and the image distortion can be suppressed.

(Flow of User Position Switching Processing)

Figure 14:
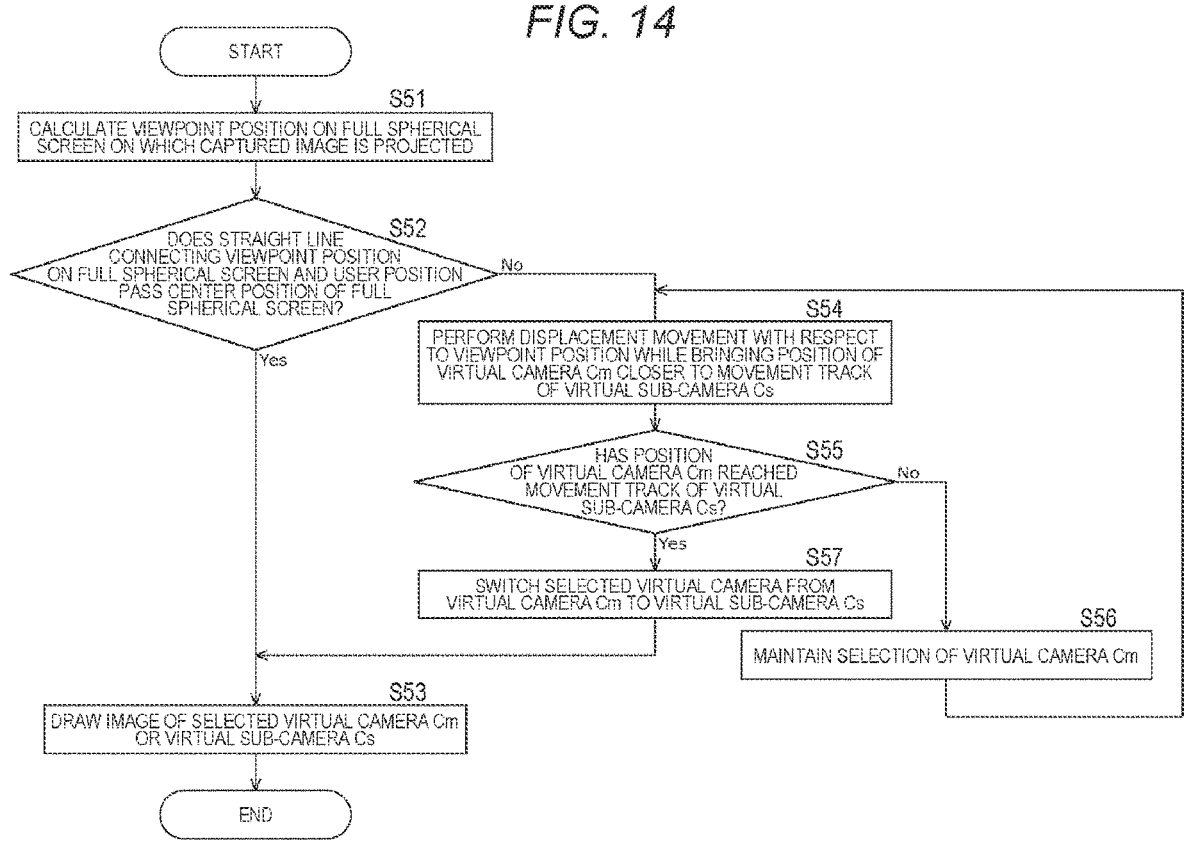
FIG. 14 is a flowchart describing a flow of user position switching processing.

Next, a flow of user position switching processing will be described with reference to a flowchart of FIG. 14.

Note that upon performing the user position switching processing, it is assumed that the virtual camera Cm is selected as the virtual camera corresponding to the user position in the initial state.

In step S51, the switching processing unit 125 calculates the position of the viewpoint T on the full spherical screen Sc on which the captured image is projected.

In step S52, the switching processing unit 125 determines whether a straight line connecting the position of the viewpoint T on the full spherical screen Sc and the user position passes through the position of the center Ct of the full spherical screen Sc.

In a case where it is determined in the determination processing of step S52 that the straight line connecting the position of the viewpoint T and the user position passes through the position of the center Ct, the processing proceeds to step S53.

In step S53, the switching processing unit 125 draws an image corresponding to the selected virtual camera Cm.

On the other hand, in a case where it is determined that the straight line connecting the position of the viewpoint T and the user position does not pass through the position of the center Ct, the processing proceeds to step S54.

In step S54, the switching processing unit 125 performs displacement movement with respect to the position of the viewpoint T while bringing the position of the virtual camera Cm closer to the movement track of the virtual sub-camera Cs.

Here, the movement track of the virtual sub-camera Cs is a straight line connecting the viewpoint T and the center Ct as illustrated in FIG. 13. Furthermore, "while bringing closer" in step S54 means to bring the position of the virtual camera Cm closer to the movement track of the virtual sub-camera Cs at a speed that does not affect the distance D to the viewpoint T and does not cause a sudden change in the user position.

In step S55, the switching processing unit 125 determines whether the position of the virtual camera Cm has reached the movement track of the virtual sub-camera Cs.

In a case where it is determined in the determination processing of step S55 that the position of the virtual camera Cm has not reached the movement track of the virtual sub-camera Cs, the processing proceeds to step S56.

In step S56, the switching processing unit 125 maintains the selection of the virtual camera Cm. At this time, an image corresponding to the selected virtual camera Cm is continuously drawn.

When the processing of step S56 ends, the processing returns to step S54, and the processing of steps S54 to S56 is repeated. Then, in a case where it is determined in the determination processing of step S55 that the position of the virtual camera Cm has reached the movement track of the virtual sub-camera Cs, the processing proceeds to step S57.

In step S57, the switching processing unit 125 switches the selected virtual camera from the virtual camera Cm to the virtual sub-camera Cs.

When the processing of step S57 is finished, the processing proceeds to step S53. In step S53, the switching processing unit 125 draws an image corresponding to the selected virtual sub-camera Cs. Note that when the processing of step S53 ends, the processing ends.

The flow of the user position switching processing has been described above.

In this user position switching processing, the movement tracks of the virtual cameras (Cm and Cs) can be set to movement tracks that provide natural motion parallax in the depth direction (±Z direction), and consequently, the VR sickness can be suppressed. Furthermore, since the position of the virtual camera Cm is brought closer to the movement track of the virtual sub-camera Cs at a speed that does not cause a sudden change in the user position without affecting the distance D to the viewpoint T, image distortion during viewing can be suppressed.

In other words, in this user position switching processing, in a case where the head movement amount in the depth direction changes in a state where the user position is separated from the reference position (the position corresponding to the center Ct) in the horizontal direction (or the vertical direction), it can be said that the user position is brought closer to the reference position in the horizontal direction (or the vertical direction), and the relative distance (the relative distance between the reference position and the user position) according to the head movement amount in the depth direction is changed.

(Comparison of Presence or Absence of Image Distortion)

Figure 15:
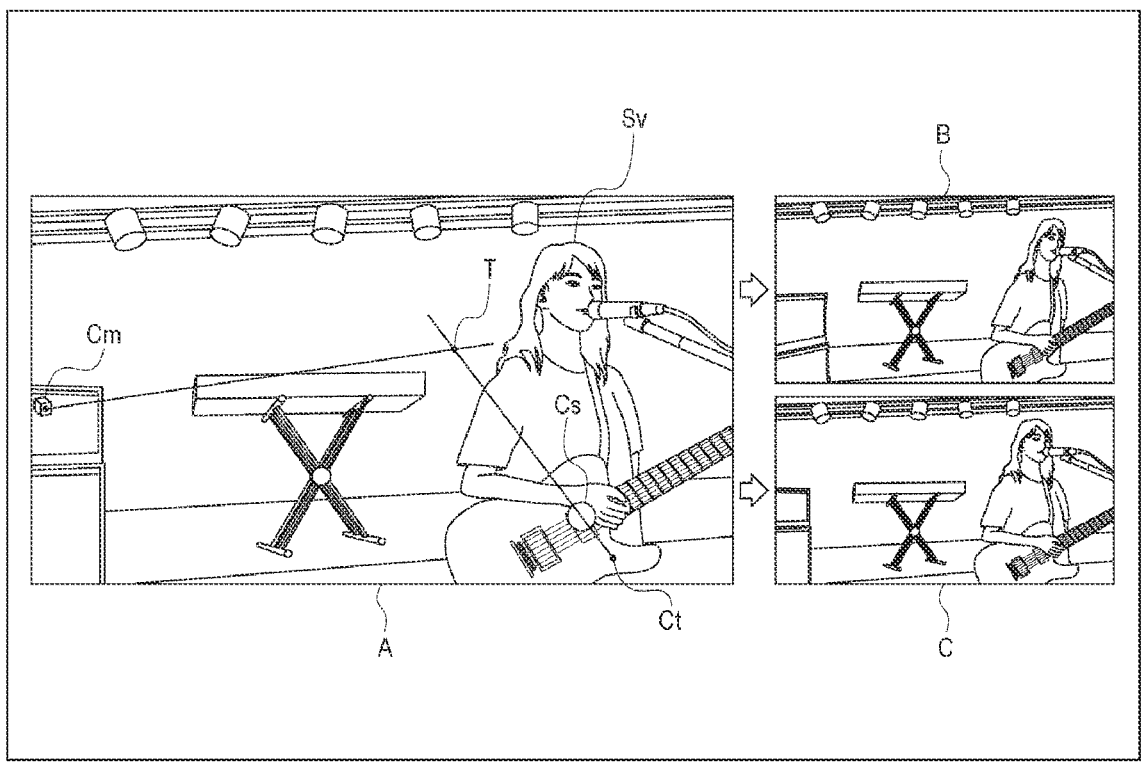
FIG. 15 illustrates an example of comparison of the image distortion due to a difference in the position of the virtual camera.

FIG. 15 illustrates an example of comparison of image distortion due to a difference in the position of the virtual camera.

A of FIG. 15 illustrates an example of arrangement of the virtual camera Cm and the virtual sub-camera Cs in a case where the viewpoint T of the user is directed to the imaged object Sv (for example, the performer) in the virtual space in which the full spherical screen Sc onto which the captured image is projected is arranged. In the above-described example, the relationship of the arrangement of the virtual cameras is used.

That is, the image of the virtual camera Cm is an image of an angle viewed from a position other than the center Ct of the full spherical screen Sc. In a case where an image corresponding to the virtual camera Cm is drawn, a distorted image is obtained (B of FIG. 15).

On the other hand, the image of the virtual sub-camera Cs is an image of an angle viewed from the virtual sub-camera Cs that is on a straight line passing through the center Ct of the full spherical screen Sc, and has a distance from the position of the viewpoint T that is equal to the distance between the position of the viewpoint T and the virtual camera Cm. In a case where an image corresponding to the virtual sub-camera Cs is drawn, an image without distortion is obtained (C of FIG. 15).

2. Modification Example

The configuration in which the reproduction device 10 includes the image processing unit 104 and the display unit 107 has been described in the above description, but a configuration in which the reproduction device 10 (image processing device such as a dedicated console) including the image processing unit 104 does not include the display unit 107 may be employed by separately providing a display device including the display unit 107. The recording device 20 is of course configured as one device, and may have each function (image processing function, recording function, distribution function, or the like) configured by an individual server.

Note that in the image reproduction system 1, which device includes each component constituting each device of the reproduction device 10 and the recording device 20 is arbitrary. In other words, the system means a set of a plurality of components (devices, modules (parts), and the like), and it does not matter whether or not all components are in the same housing.

Therefore, both of a plurality of devices housed in separate housings and connected via a network and a single device in which a plurality of modules is housed in one housing are systems. Furthermore, a communication form of each component is also arbitrary. In other words, the components may be connected via the Internet or may be connected via a local net (local area network (LAN) or wide area network (WAN)). Moreover, the components may be connected by wire or wirelessly.

In the above description, the case of performing the viewing experience of the three-dimensional virtual space in which the full spherical image (captured image) is projected on the full spherical screen Sc formed by a 360-degree full sphere has been exemplified, but the full sphere is an example, and the full spherical screen Sc is a generic term including a screen on a spherical surface partially using a spherical surface of a 180-degree half sphere or the like.

Furthermore, the video distribution service of a music live show has been described as an example in the above description, but the present technology can be applied to a viewing experience of a live action of any full spherical screen, such as a simulated experience of travel, conference, other leisure facilities, or the like, in addition to a live viewing experience of sports or the like, as a viewing experience of a live action involving physical exercise of the user.

Furthermore, the present technology can be applied not only to the viewing experience of a live action of the full spherical screen, but also to, for example, a screen shot of a live action, an aerial image from an unmanned aerial vehicle (drone), or the like.

Note that in the present description, the "viewpoint" means an object (gaze point) viewed by the user on the full spherical screen Sc on which the captured image is projected. Therefore, a position (standing point) at which the user is looking at the object (gaze point) is described as a "position of the head of the user U" or a "user position" to be distinguished from the "viewpoint".

Furthermore, in the present description, the "image" may be read as a "video".

3. Configuration of Computer

Figure 8:
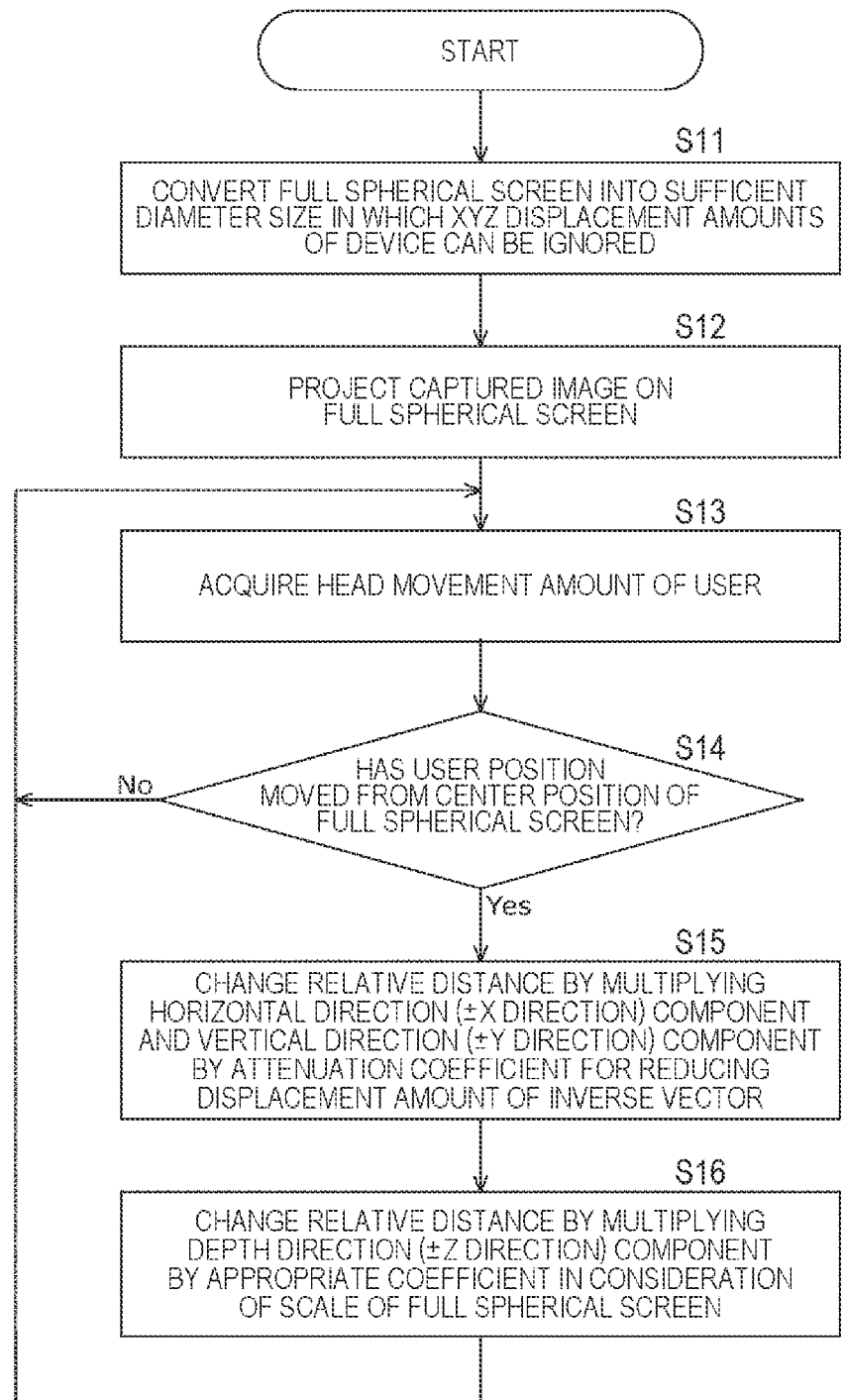
FIG. 8 is a flowchart describing a flow of image processing corresponding to suppression of the VR sickness and the image distortion.
Figure 16:
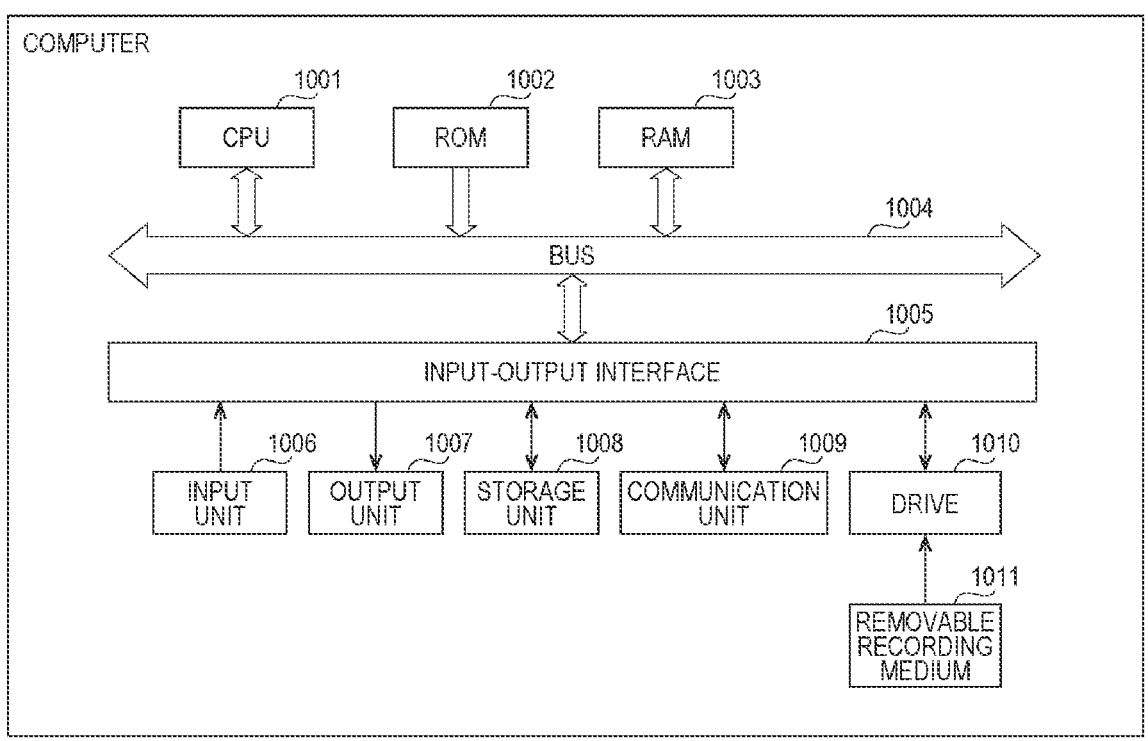
FIG. 16 is a diagram illustrating a configuration example of a computer.

The above-described series of processes (for example, the image processing and the like illustrated in FIG. 8) can be executed by hardware or software. In a case where the series of processes is executed by software, a program constituting the software is installed in a computer of each device. FIG. 16 is a block diagram illustrating a configuration example of hardware of a computer that executes the above-described series of processes by a program.

In the computer 1000, a central processing unit (CPU) 1001, a read only memory (ROM) 1002, and a random access memory (RAM) 1003 are interconnected via a bus 1004. An input-output interface 1005 is further connected to the bus 1004. An input unit 1006, an output unit 1007, a recording unit 1008, a communication unit 1009, and a drive 1010 are connected to the input-output interface 1005.

The input unit 1006 includes a microphone, a keyboard, a mouse, and the like. The output unit 1007 includes a speaker, a display, and the like. The recording unit 1008 includes a hard disk, a nonvolatile memory, and the like. The communication unit 1009 includes a network interface and the like. The drive 1010 drives a removable recording medium 1011 such as a magnetic disk, an optical disk, a magneto-optical disk, or a semiconductor memory.

In the computer 1000 configured as described above, the CPU 1001 loads, for example, a program recorded in the ROM 1002 or the recording unit 1008 into the RAM 1003 via the input-output interface 1005 and the bus 1004, and executes the program, so as to perform the above-described series of processes.

The program executed by the computer 1000 (CPU 1001) can be provided by being recorded on, for example, a removable recording medium 1011 as a package medium or the like. Furthermore, the program can be provided via a wired or wireless transmission medium such as a local area network, the Internet, or digital satellite broadcasting.

In the computer 1000, the program can be installed in the recording unit 1008 via the input-output interface 1005 by mounting the removable recording medium 1011 to the drive 1010. Furthermore, the program can be received by the communication unit 1009 via a wired or wireless transmission medium and installed in the recording unit 1008. In addition, the program can be installed in the ROM 1002 or the recording unit 1008 in advance.

Here, in the present description, the processing performed by the computer according to the program does not necessarily have to be performed in time series in the order described as the flowchart. That is, the processing performed by the computer according to the program also includes processing that is executed in parallel or individually (for example, parallel processing or object processing). Furthermore, the program may be processed by one computer (processor) or may be processed in a distributed manner by a plurality of computers.

Note that the embodiments of the present technology are not limited to the above-described embodiments, and various modifications are possible without departing from the gist of the present technology.

Furthermore, each step of the above-described processing can be executed by one device or can be executed in a shared manner by a plurality of devices. Moreover, in a case where a plurality of processes is included in one step, the plurality of processes included in the one step can be executed in a shared manner by a plurality of devices in addition to being executed by one device.

Note that the present technology can also employ the following configurations.

(1)

A reproduction device including an image processing unit that performs processing including:
projecting an image captured from a specific position in a real space on a projection surface arranged according to a reference position set in a virtual space;
acquiring a head movement amount of a user viewing the projected image;
changing, according to the head movement amount with respect to the reference position in a first direction that is at least one of a left-right direction or an up-down direction as viewed from the user, a first relative distance between the reference position and a user position in the virtual space in the first direction;
changing, according to the head movement amount with respect to the reference position in a second direction that is a front-back direction as viewed from the user, a second relative distance between the reference position and the user position in the second direction; and
causing a change amount of the first relative distance with respect to the head movement amount in the first direction to be smaller than a change amount of the second relative distance with respect to the head movement amount in the second direction.

(2)

The reproduction device according to (1) above, in which the image processing unit multiplies by a first coefficient that reduces a change amount of the first relative distance with respect to the head movement amount as a component in the first direction.

(3)

The reproduction device according to (2) above, in which the image processing unit changes the first relative distance by multiplying an inverse vector of a movement vector corresponding to the head movement amount by the first coefficient that reduces a change amount thereof as a component in the first direction on the projection surface.

(4)

The reproduction device according to (2) or (3) above, in which
the image processing unit multiplies by a second coefficient corresponding to a size of the projection surface as a component in the second direction.

(5)

The reproduction device according to (4) above, in which the second coefficient is a value that generates natural motion parallax in the second direction according to movement of a head of the user.

(6)

The reproduction device according to (4) or (5) above, further including
a relationship of the second coefficient>the first coefficient>0.

(7)

The reproduction device according to any one of (1) to (6) above, in which
in a case where the head movement amount in the second direction changes in a state where the user position is separated from the reference position in the first direction, the image processing unit brings the user position closer to the reference position in the first direction and changes the second relative distance according to the head movement amount in the second direction.

(8)

The reproduction device according to (7) above, in which the image processing unit
arranges, in a case of moving toward a viewpoint of the user on the projected image, a second virtual camera different from a first virtual camera arranged corresponding to the user position at a predetermined position on a straight line connecting the viewpoint and the reference position, and switches, when a position of the first virtual camera that has moved on a first movement track from the user position crosses a second movement track of the second virtual camera, from an image corresponding to the first virtual camera to an image corresponding to the second virtual camera.

(9)

The reproduction device according to (8) above, in which the image processing unit
moves the position of the first virtual camera on the first movement track at predetermined time intervals so as to approach the second movement track, and
switches, when the position of the first virtual camera crosses the second movement track, from the image corresponding to the first virtual camera to the image corresponding to the second virtual camera, and
moves a position of the second virtual camera on the second movement track at predetermined time intervals so as to approach a position of the viewpoint.

(10)

The reproduction device according to (8) or (9) above, in which
movement of the first virtual camera on the first movement track and movement of the second virtual camera on the second movement track temporally correspond to movement from the user position toward the direction of the viewpoint.

(11)

The reproduction device according to any one of (8) to (10) above, in which
the image processing unit sets a boundary region that is a region in which the first virtual camera and the second virtual camera are allowed to move in a region corresponding to the projection surface.

(12)

The reproduction device according to (1) above, in which
in a case of cutting out a trimmed image including a viewpoint of the user on the projected image in a state where the user position is separated from the reference position, the image processing unit cuts out a trimmed image when the viewpoint is viewed from a predetermined position corresponding to the reference position.

(13) The reproduction device according to (12) above, in which
the image processing unit arranges a second virtual camera, which is different from a first virtual camera arranged corresponding to the user position, at a position that is on a straight line connecting the viewpoint and the reference position and is separated from the viewpoint by a same distance as the user position.

(14) The reproduction device according to (13) above, in which
the image processing unit switches an image corresponding to the first virtual camera to an image corresponding to the second virtual camera in a case of cutting out the trimmed image.

(15) The reproduction device according to any one of (1) to (14) above, in which
the projection surface is a full spherical screen.

(16) The reproduction device according to (15) above, in which
the reference position is a position corresponding to a center of the full spherical screen.

(17) The reproduction device according to (15) above, in which
the reproduction device is configured as a head mounted display.

(18) The reproduction device according to (17) above, in which
the image processing unit converts the full spherical screen into a sufficient diameter size in which a change amount of each component of XYZ axes of the head mounted display is ignorable.

(19) A reproduction method including, by a reproduction device:
projecting an image captured from a specific position in a real space on a projection surface arranged according to a reference position set in a virtual space;
acquiring a head movement amount of a user viewing the projected image;
changing, according to the head movement amount with respect to the reference position in a first direction that is at least one of a left-right direction or an up-down direction as viewed from the user, a first relative distance between the reference position and a user position in the virtual space in the first direction;
changing, according to the head movement amount with respect to the reference position in a second direction that is a front-back direction as viewed from the user, a second relative distance between the reference position and the user position in the second direction; and
causing a change amount of the first relative distance with respect to the head movement amount in the first direction to be smaller than a change amount of the second relative distance with respect to the head movement amount in the second direction.

(20) A recording medium recording a program for causing a computer to function as an image processing unit that performs processing including:
projecting an image captured from a specific position in a real space on a projection surface arranged according to a reference position set in a virtual space;
acquiring a head movement amount of a user viewing the projected image;
changing, according to the head movement amount with respect to the reference position in a first direction that is at least one of a left-right direction or an up-down direction as viewed from the user, a first relative distance between the reference position and a user position in the virtual space in the first direction;
changing, according to the head movement amount with respect to the reference position in a second direction that is a front-back direction as viewed from the user, a second relative distance between the reference position and the user position in the second direction; and
causing a change amount of the first relative distance with respect to the head movement amount in the first direction to be smaller than a change amount of the second relative distance with respect to the head movement amount in the second direction.

REFERENCE SIGNS LIST

1 Image reproduction system
10 Reproduction device
20 Recording device
21, 22-1, 22-2 Camera
30 Network
101 Control unit
102 Memory
103 Sensor
104 Image processing unit
105 Storage unit
106 Communication unit
107 Display unit
108 Sound output unit
121 Image projection unit
122 Head movement amount acquisition unit
123 Relative distance adjustment unit
124 Trimmed image generation unit
125 Switching processing unit
1001 CPU
1011 Removable recording medium

The invention claimed is:
1. A reproduction device comprising an image processing unit that performs processing including:
projecting an image captured from a specific position in a real space on a projection surface arranged according to a reference position set in a virtual space;
acquiring a head movement amount of a user viewing the projected image;
changing, according to the head movement amount with respect to the reference position in a first direction that is at least one of a left-right direction or an up-down direction as viewed from the user, a first relative distance between the reference position and a user position in the virtual space in the first direction;
changing, according to the head movement amount with respect to the reference position in a second direction that is a front-back direction as viewed from the user, a second relative distance between the reference position and the user position in the second direction; and causing a change amount of the first relative distance with respect to the head movement amount in the first direction to be smaller than a change amount of the second relative distance with respect to the head movement amount in the second direction.

2. The reproduction device according to claim 1, wherein the image processing unit multiplies by a first coefficient that reduces a change amount of the first relative distance with respect to the head movement amount as a component in the first direction.

3. The reproduction device according to claim 2, wherein the image processing unit changes the first relative distance by multiplying an inverse vector of a movement vector corresponding to the head movement amount by the first coefficient that reduces a change amount thereof as a component in the first direction on the projection surface.

4. The reproduction device according to claim 2, wherein the image processing unit multiplies by a second coefficient corresponding to a size of the projection surface as a component in the second direction.

5. The reproduction device according to claim 4, wherein the second coefficient is a value that generates natural motion parallax in the second direction according to movement of a head of the user.

6. The reproduction device according to claim 4, further comprising
a relationship of the second coefficient>the first coefficient>0.

7. The reproduction device according to claim 1, wherein
in a case where the head movement amount in the second direction changes in a state where the user position is separated from the reference position in the first direction, the image processing unit brings the user position closer to the reference position in the first direction and changes the second relative distance according to the head movement amount in the second direction.

8. The reproduction device according to claim 7, wherein the image processing unit
arranges, in a case of moving toward a viewpoint of the user on the projected image, a second virtual camera different from a first virtual camera arranged corresponding to the user position at a predetermined position on a straight line connecting the viewpoint and the reference position, and
switches, when a position of the first virtual camera that has moved on a first movement track from the user position crosses a second movement track of the second virtual camera, from an image corresponding to the first virtual camera to an image corresponding to the second virtual camera.

9. The reproduction device according to claim 8, wherein the image processing unit
moves the position of the first virtual camera on the first movement track at predetermined time intervals so as to approach the second movement track,
switches, when the position of the first virtual camera crosses the second movement track, from the image corresponding to the first virtual camera to the image corresponding to the second virtual camera, and
moves a position of the second virtual camera on the second movement track at predetermined time intervals so as to approach a position of the viewpoint.

10. The reproduction device according to claim 9, wherein
movement of the first virtual camera on the first movement track and movement of the second virtual camera on the second movement track temporally correspond to movement from the user position toward the direction of the viewpoint.

11. The reproduction device according to claim 8, wherein the image processing unit sets a boundary region that is a region in which the first virtual camera and the second virtual camera are allowed to move in a region corresponding to the projection surface.

12. The reproduction device according to claim 1, wherein
in a case of cutting out a trimmed image including a viewpoint of the user on the projected image in a state where the user position is separated from the reference position, the image processing unit cuts out a trimmed image when the viewpoint is viewed from a predetermined position corresponding to the reference position.

13. The reproduction device according to claim 12, wherein
the image processing unit arranges a second virtual camera, which is different from a first virtual camera arranged corresponding to the user position, at a position that is on a straight line connecting the viewpoint and the reference position and is separated from the viewpoint by a same distance as the user position.

14. The reproduction device according to claim 13, wherein
the image processing unit switches an image corresponding to the first virtual camera to an image corresponding to the second virtual camera in a case of cutting out the trimmed image.

15. The reproduction device according to claim 1, wherein
the projection surface is a full spherical screen.

16. The reproduction device according to claim 15, wherein
the reference position is a position corresponding to a center of the full spherical screen.

17. The reproduction device according to claim 15, wherein
the reproduction device is configured as a head mounted display.

18. The reproduction device according to claim 17, wherein
the image processing unit converts the full spherical screen into a sufficient diameter size in which a change amount of each component of XYZ axes of the head mounted display is ignorable.

19. A reproduction method comprising, by a reproduction device:
projecting an image captured from a specific position in a real space on a projection surface arranged according to a reference position set in a virtual space;
acquiring a head movement amount of a user viewing the projected image;
changing, according to the head movement amount with respect to the reference position in a first direction that is at least one of a left-right direction or an up-down direction as viewed from the user, a first relative distance between the reference position and a user position in the virtual space in the first direction;
changing, according to the head movement amount with respect to the reference position in a second direction that is a front-back direction as viewed from the user, a second relative distance between the reference position and the user position in the second direction; and
causing a change amount of the first relative distance with respect to the head movement amount in the first direction to be smaller than a change amount of the second relative distance with respect to the head movement amount in the second direction.

20. A non-transitory computer readable medium recording a program for causing a computer to function as an image processing unit that performs processing comprising:

projecting an image captured from a specific position in a real space on a projection surface arranged according to a reference position set in a virtual space;

acquiring a head movement amount of a user viewing the projected image;

changing, according to the head movement amount with respect to the reference position in a first direction that is at least one of a left-right direction or an up-down direction as viewed from the user, a first relative distance between the reference position and a user position in the virtual space in the first direction;

changing, according to the head movement amount with respect to the reference position in a second direction that is a front-back direction as viewed from the user, a second relative distance between the reference position and the user position in the second direction; and causing a change amount of the first relative distance with respect to the head movement amount in the first direction to be smaller than a change amount of the second relative distance with respect to the head movement amount in the second direction.

\* \* \* \* \*